US007228693B2

(12) United States Patent
Helt

(10) Patent No.: US 7,228,693 B2
(45) Date of Patent: Jun. 12, 2007

(54) CONTROLLING AIRFLOW IN AN AIR CONDITIONING SYSTEM FOR CONTROL OF SYSTEM DISCHARGE TEMPERATURE AND HUMIDITY

(75) Inventor: Robert W. Helt, Tyler, TX (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 10/755,643

(22) Filed: Jan. 12, 2004

(65) Prior Publication Data
US 2005/0150238 A1   Jul. 14, 2005

(51) Int. Cl.
F25B 49/00 (2006.01)
F25D 17/04 (2006.01)
F24F 3/14 (2006.01)

(52) U.S. Cl. .................. 62/176.6; 62/180; 62/186; 236/15 R; 236/44 C

(58) Field of Classification Search ............... 62/176.6, 62/177, 178, 180, 186, 126, 129, 176.1; 236/44 A, 236/44 C, 15 R
See application file for complete search history.

(56) References Cited

U.S. PATENT DOCUMENTS 4,003,729 A    1/1977   McGrath
4,257,238 A    3/1981   Kountz et al.
4,315,413 A    2/1982   Baker
4,899,551 A *  2/1990   Weintraub ................. 62/176.6
4,907,416 A *  3/1990   Fujii .......................... 62/180
5,172,565 A * 12/1992   Wruck et al. ................ 62/177
5,303,561 A *  4/1994   Bahel et al. ................. 62/186
5,516,041 A *  5/1996   Davis et al. ............... 236/49.3
5,718,372 A    2/1998   Tishler
6,826,920 B2 * 12/2004   Wacker ..................... 62/176.6

* cited by examiner

Primary Examiner—Marc Norman
(74) Attorney, Agent, or Firm—William J. Beres; William O'Driscoll

(57) ABSTRACT

An air conditioning system may comprise an air handler, heat pump or fossil fuel furnace and may include a variable speed blower for conducting air through the system and operably connected to a controller which is also connected to a thermostat and/or humidity sensor. A discharge air temperature sensor may be disposed downstream of or embedded in a heat exchanger of the air conditioning system and connected to the controller for controlling the blower speed and airflow through the system. The amount of heating or cooling effect produced by the heat exchanger or blower speed may be adjusted to provide a constant discharge temperature or lower the humidity of air returning to a controlled space.

21 Claims, 6 Drawing Sheets

CONTROLLING AIRFLOW IN AN AIR CONDITIONING SYSTEM FOR CONTROL OF SYSTEM DISCHARGE TEMPERATURE AND HUMIDITY

BACKGROUND OF THE INVENTION

In forced airflow air conditioning systems, a longstanding problem has been one of attempting to set the proper airflow rate for an air handler, furnace or heat pump or a combination thereof to match system capacity at the time of installation. This is a difficult and nettlesome problem to overcome and often the proper airflow is not set thereby causing poor system efficiency and discomfort to occupants of the space being served by the system.

For example, on startup of air conditioning systems, such as heat pumps, as well as systems which incorporate other types of heating sources, a constant speed circulating blower will deliver relatively cold air to the controlled space before the heat pump heating coil is at a stabilized operating condition and outputting sufficient heat to the controlled space. Thus, the occupants of the space will experience relatively cold air circulation and discomfort. In other situations, such as when operating in the cooling mode, it is desirable to adjust the air temperature of the system to improve humidity control and to provide lower system discharge temperatures. However, even if automatic control can be achieved to alleviate the problems described above, it is also desirable to provide for a system installer or service person to be able to adjust airflow rates to override any automatic settings of the system. It is to the above-mentioned ends that the present invention has been developed.

SUMMARY OF THE INVENTION

The present invention provides systems and methods to control airflow rates in air conditioning systems to improve system operating efficiency, reduce discomfort from cold airflow into a controlled space on system startup, for example, control humidity in a space served by an air conditioning system and control discharge air temperature of a heating and/or cooling system.

In accordance with one aspect of the present invention, a forced airflow air conditioning system is provided with a controller operably connected to a motor of a system air circulation blower, together with temperature sensors for sensing inlet air temperature to the system and discharge temperature from the system and whereby discharge temperature may be held constant or may be varied based on the sensed inlet air temperature to the system.

In accordance with another aspect of the invention, a system and method are providing for controlling discharge air temperature from a system operating in the cooling mode to provide improved humidity control and/or to lower system air discharge temperature. The system can be provided with a single sensor embedded in the heating/cooling coil of a heat pump or air handler operating as part of a vapor compression type heat exchange system.

The above noted aspects of the present invention together with other important advantages and superior features will be further appreciated by those skilled in the art upon reading the detailed description which follows in conjunction with the drawings.

DETAILED DESCRIPTION OF THE PREFERRED EMBODIMENTS

Figure 1:
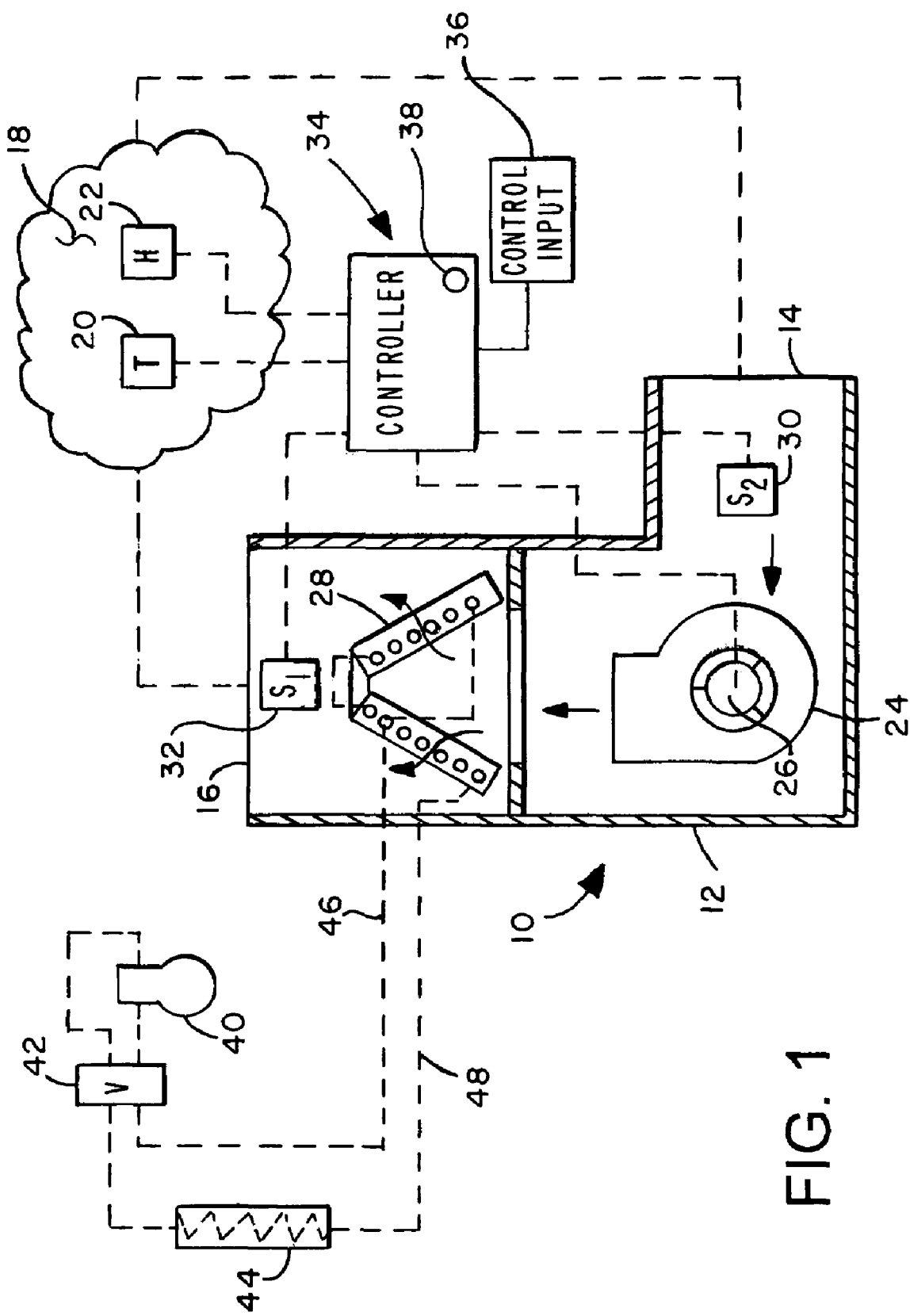
FIG. 1 is a somewhat schematic diagram of an air conditioning system including a motor driven blower, a heat exchanger and a control system in accordance with the invention.

In the description which follows like elements are marked throughout the specification and drawing with the same reference numerals, respectively. The drawing figures may be in somewhat schematic form and flow diagrams may show only major steps in accordance with the invention and may otherwise be abbreviated in the interest of clarity and conciseness.

Referring to FIG. 1, there is illustrated an air conditioning system in accordance with the invention and generally designated by the numeral 10. The system 10 includes a cabinet 12 including an air inlet opening 14 and an air discharge opening 16. The system 10 is adapted to provide conditioned air to a controlled space 18 at which a temperature control sensor or thermostat 20 may be disposed. A second sensor comprising a humidity sensor or humidistat 22 may also be disposed in the controlled space 18, which space is operable to receive air discharged from the system 10 through the discharge opening 16 and to return air circulating from the space 18 to the system by way of the inlet opening 14.

The system 10 includes a suitable air circulating blower 24, preferably provided with a variable speed electric drive motor 26, for circulating a variable flow rate of air through the system from the inlet opening 14 to the discharge opening 16. A source of heating or cooling effect comprising a heat exchanger 28 is disposed in the cabinet 12 downstream of the blower 24 for treating air flowing through the cabinet 12 prior to discharge back to the space 18. The heat exchanger 28 is preferably part of and connected to a vapor compression type refrigerant fluid flow circuit, including a conventional compressor 40, a condenser 44, a flow reversing valve 42 and conduits 46 and 48 connecting heat exchanger 28 to the remainder of the system. The flow circuit to which the heat exchanger 28 is connected may be a conventional vapor compression type cooling system or a heat pump whereby the heat exchanger 28 operates as an evaporator during cooling operation of the system 10 and as a heating coil when the system 10 is called upon to provide heat to the space 18. Heat exchanger 28 may be of a conventional fin and tube type and arranged in one or more sections, including the two section, so called A frame type illustrated.

Referring still further to FIG. 1, the system 10 may include a return air temperature sensor 30, preferably disposed in the cabinet 12 upstream of the blower 24 or in a suitable duct leading to the cabinet 12 from the space 18. A discharge air temperature sensor 32 is disposed downstream of the heat exchanger 28, preferably within the cabinet 12, for sensing the discharge temperature of air flowing through the air conditioning system 10. Sensors 30 and 32 together with the thermostat 20, the humidity sensor 22 and the motor 26 are operably connected to a controller, generally designated by the numeral 34 for controlling operation of the system 10. The controller 34 may include a suitable microcontroller of a type known to those skilled in the art which may be programmed to operate in accordance with methods of the invention utilizing information received from the sensors 30 and 32 as well as the thermostat 20 and the humidity sensor 22. Operation of the controller 34 may be modified by a suitable control input device 36 which may comprise a keypad, a touch screen control panel or other command or control signal input devices, not shown, known to those skilled in the art. The control circuit or controller 34 may also include one or more visual display elements, such as a variable intensity light emitting diode (LED) 38, as well as other visual display devices, also not shown, for displaying certain operating features of the system 10 including, for example, indication of the actual flow rate (i.e. cubic feet per minute) of air flowing through the system 10.

Air is circulated through the cabinet 12 at a selected rate by blower 24 by varying the speed of the blower motor 26 to vary the speed of a suitable centrifugal fan, for example, not shown and drivenly connected to the motor. Air is circulated from the inlet opening 14 through the blower 24 then through the so called "A" frame type heat exchanger arrangement of the heat exchanger 28 and past the temperature sensor 32 to exit the cabinet 12 and, via suitable ducting, return to the space 18. Air is, of course, circulated from the space 18 to the inlet opening 14 of cabinet 12 also via suitable ducting indicated schematically in FIG. 1. The air conditioning system 10 may be operated in a heating mode or cooling mode if the heat exchanger 28 is connected to the heat pump vapor compression system including the compressor 40, the flow direction reversing valve 42 and the heat exchanger 44 in a conventional manner. Alternatively, the air conditioning system 10 may be operated in the heating mode or cooling mode alone if a reversing valve 42 is not provided in the refrigerant flow circuit. The flow circuitry of the system illustrated in FIG. 1 is somewhat simplified and throttling valves or similar expansion devices as well as bypass check valves filters and accumulators have been eliminated from the drawing figure in the interest of conciseness. Compressor 40 is preferably electric motor driven and controlled by controller 34 also.

Figure 3:
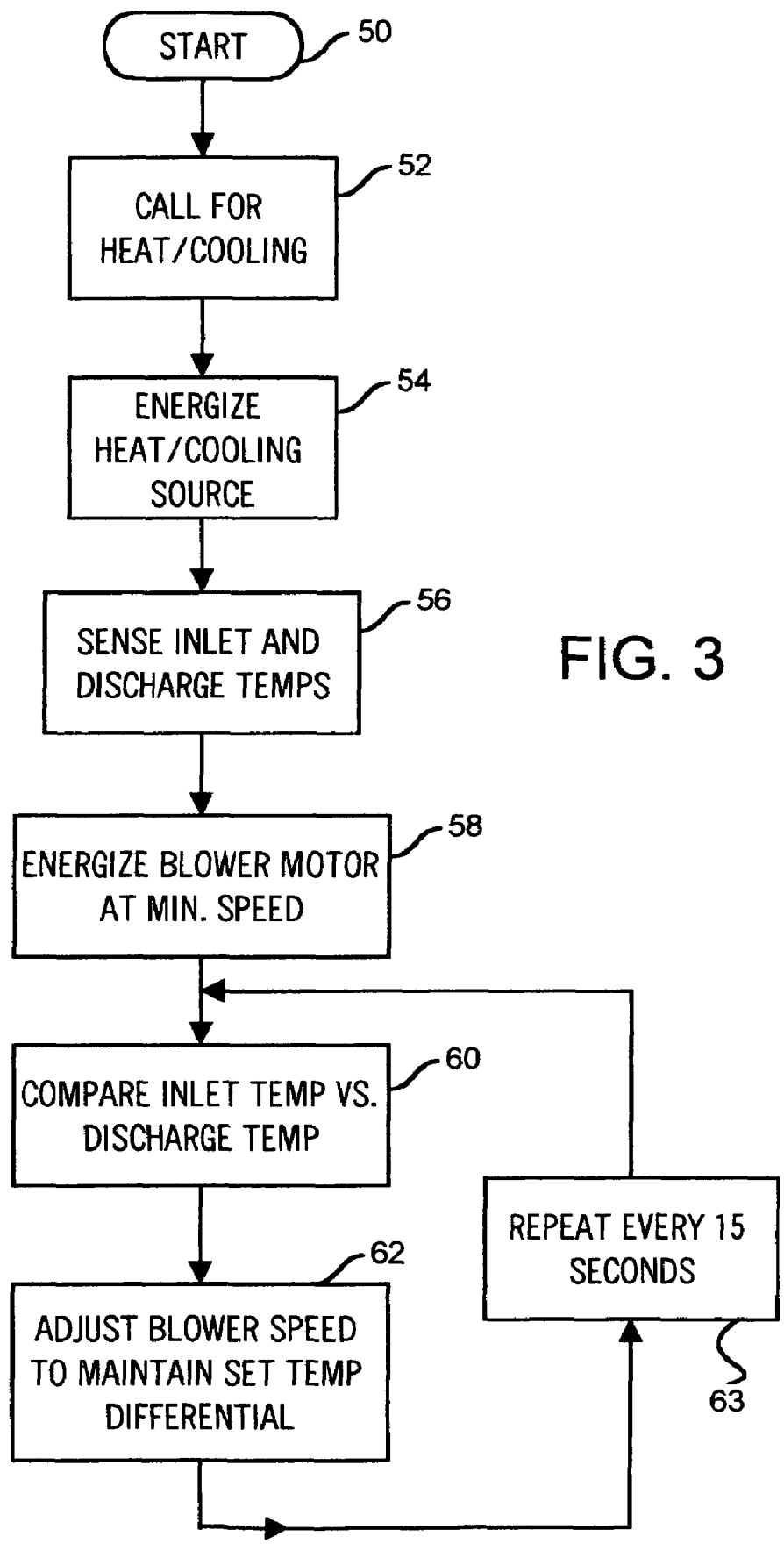
FIG. 3 is a flow diagram illustrating one method of operating an air conditioning system in accordance with the invention.

FIG. 3 illustrates a somewhat simplified flow diagram for one method of operating the air conditioning system 10. With the system 10 enabled according to the diagram of FIG. 3 at step 50 and the thermostat 20 calling for heat or cooling at step 52 the system will be energized at step 54 to provide heating or cooling effect at heat exchanger 28. Controller 34 is operable to sense the inlet and discharge temperatures at the sensors 30 and 32, as indicated at step 56, and the controller 34 may be pre-programmed to maintain a predetermined temperature differential between the sensors 30 and 32 which is controllable by energizing the blower motor 26 as indicated at step 58. Alternatively, the inlet air temperature to system 10 may be taken to be that which is sensed by the temperature sensor of thermostat 20 and sensor 30 could be eliminated, if desired. Typically the blower motor 26 may be energized at a predetermined minimum speed while the inlet temperature sensed at sensor 30 or thermostat 20 is compared with the discharges temperature sensed at sensor 32, as indicated at step 60. Accordingly, the controller 34 may then adjust the speed of the blower motor 26 at step 62 to maintain a preset temperature differential between sensors 30 and 32. Steps 60 and 62 may be repeated every fifteen seconds, for example, as indicated at step 63, until the heat or cooling effect called for by thermostat 20 is satisfied by the air conditioning system 10 at which time the blower motor may be de-energized until the thermostat 20 again calls for heating or cooling effect.

Figure 4:
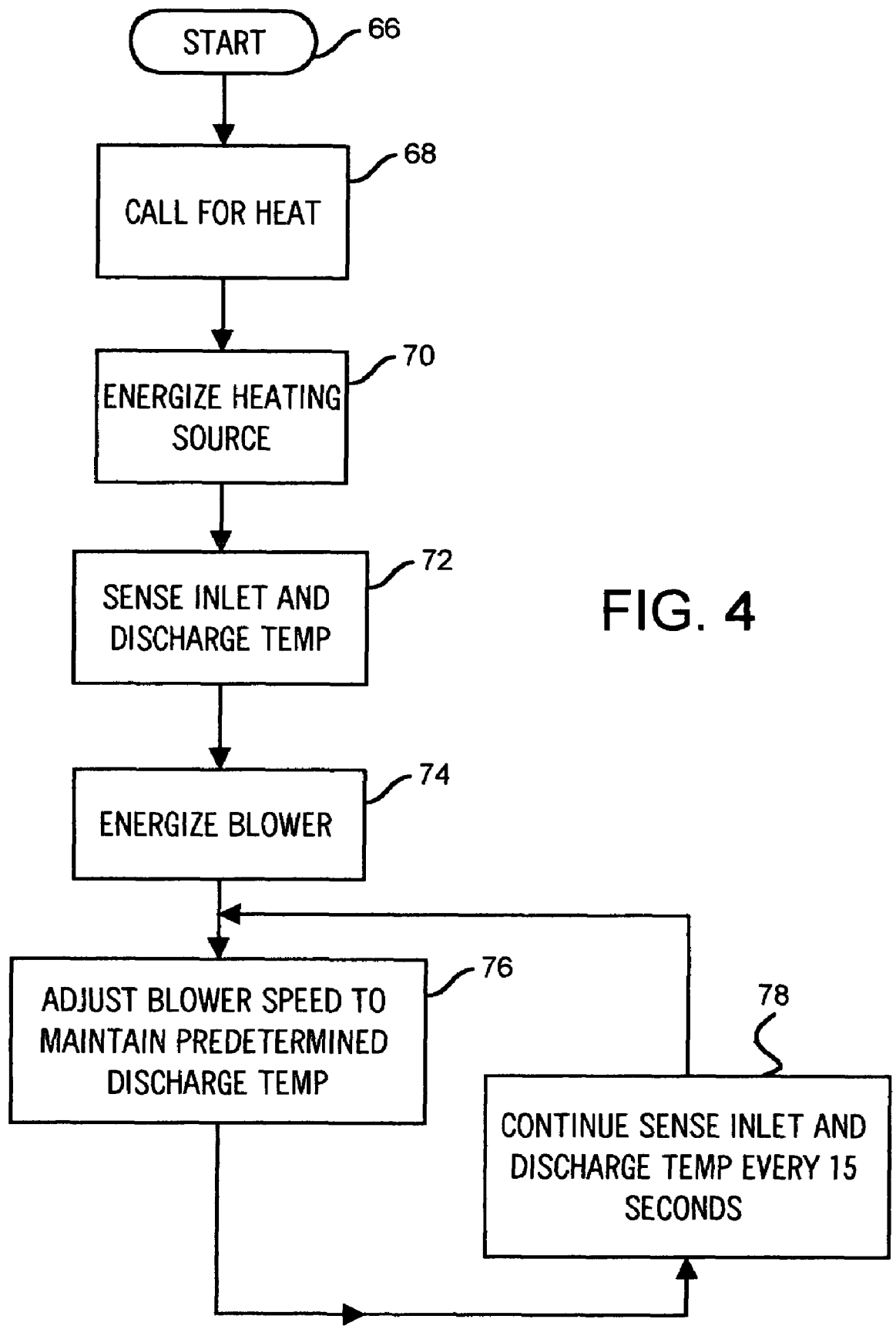
FIG. 4 is a flow diagram illustrating another method of operating an air conditioning system in accordance with the invention.

Another mode of operating the system 10 is illustrated briefly in FIG. 4, with the system 10 operating in the heating mode, that is with the heat exchanger 28 operating as a condenser. With the system 10 enabled at step 66 in FIG. 4, with the thermostat 20 calling for heat at step 68, the system 10 may be energized to operate in the heating mode at step 70 while inlet and discharge temperatures sensed at sensors 30 and 32, or thermostat 20 and sensor 32, are monitored and reported to the controller 30 at step 72. Blower 24 may be energized only when a predetermined temperature is sensed by sensor 32, FIG. 1, at step 72 or commensurate with the initiation of step 70. However, energization of the blower motor 26 at step 74 would likely occur at minimum speed to avoid discharging cold air into the space 18, that is, giving the heat exchanger 28 sufficient time to begin providing heat exchange with air resident in and flowing through the cabinet 12. In fact, at step 76 in FIG. 4, blower speed is controlled to maintain a predetermined discharge temperature so that, upon startup, for example, of blower 24 it may be operated at minimum speed while the discharge temperature is sensed at sensor 32 and if the predetermined minimum discharge temperature is not registered, blower 24 may either be de-energized or operated at a minimum speed until it is indicated that the temperature sensed at sensor 32 is increasing beyond the predetermined discharge temperature. The program residing in controller 34 and contemplated in accordance with the flow chart of FIG. 4 will carry out the step 78 of continuing to monitor temperatures at sensor 30 or thermostat 20 and sensor 32 and adjust blower speed to maintain airflow to the space 18 at a constant discharge temperature from the cabinet 12. Such operation may, of course, cause blower speed and airflow through the cabinet 12 to vary in order to maintain the predetermined discharge temperature.

Figure 5:
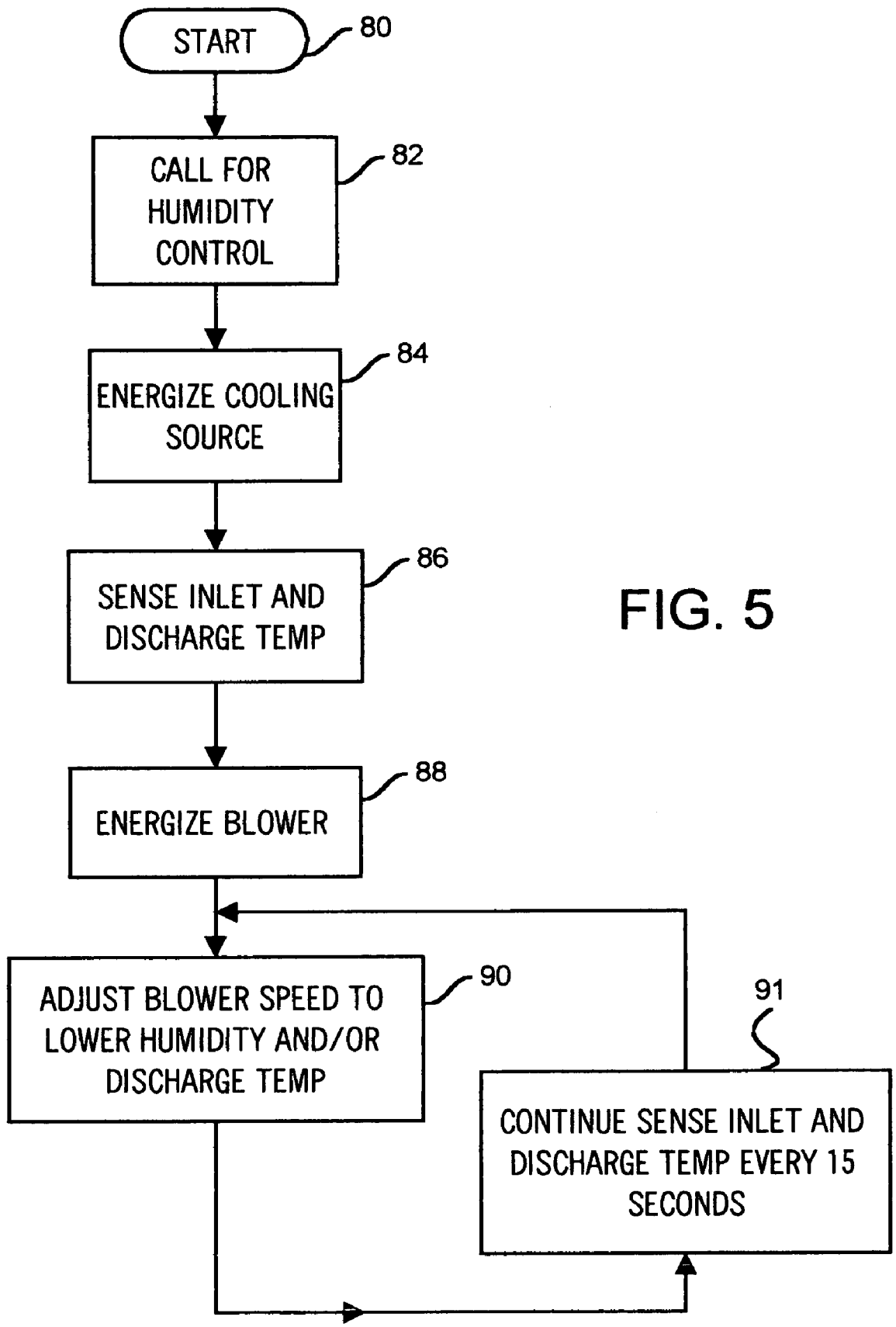
FIG. 5 is a flow diagram illustrating a further method of operating an air conditioning system in accordance with the invention.

With the system 10 operating in the cooling mode, another method of operation may be carried out, as indicated in FIG. 5, wherein the rate of airflow across the heat exchanger 28 may be controlled in accordance with the need for reduced humidity. For example, with the system 10 enabled in the cooling mode at step 80 and, upon call for lower humidity by the humidity sensor 22 at step 82, the system 10 may be energized in the cooling mode at step 84 and temperatures sensed at sensor 30 or thermostat 20 and sensor 32 at step 86. Blower motor 26 may be energized substantially simultaneously at step 88. However, blower speed will be adjusted to obtain lower humidity and/or discharge temperature sensed at sensor 32 in step 90.

For example, if the humidity as set at sensor 22 was required to be lowered, blower speed would be reduced in order to provide for greater heat exchange of the air flowing across the heat exchanger 28 while also permitting lower refrigerant temperatures of refrigerant fluid flowing through the heat exchanger 28. Thus, for the air being circulated through the heat exchanger 28 a greater reduction in temperature and greater removal of water vapor from such flowing air would be achieved. Thermostat 20 may also be operable to provide an input signal to controller 34 and the setpoint of the thermostat may be a controlling factor as well, once the ambient temperature in space 18 approaches the thermostat setpoint, to prevent discomfort from excess cooling being carried out by the system 10 when operating in accordance with the diagram of FIG. 5. Step 90 should be carried out on a substantially continuous basis as indicated at 91 in FIG. 5.

Figure 2:
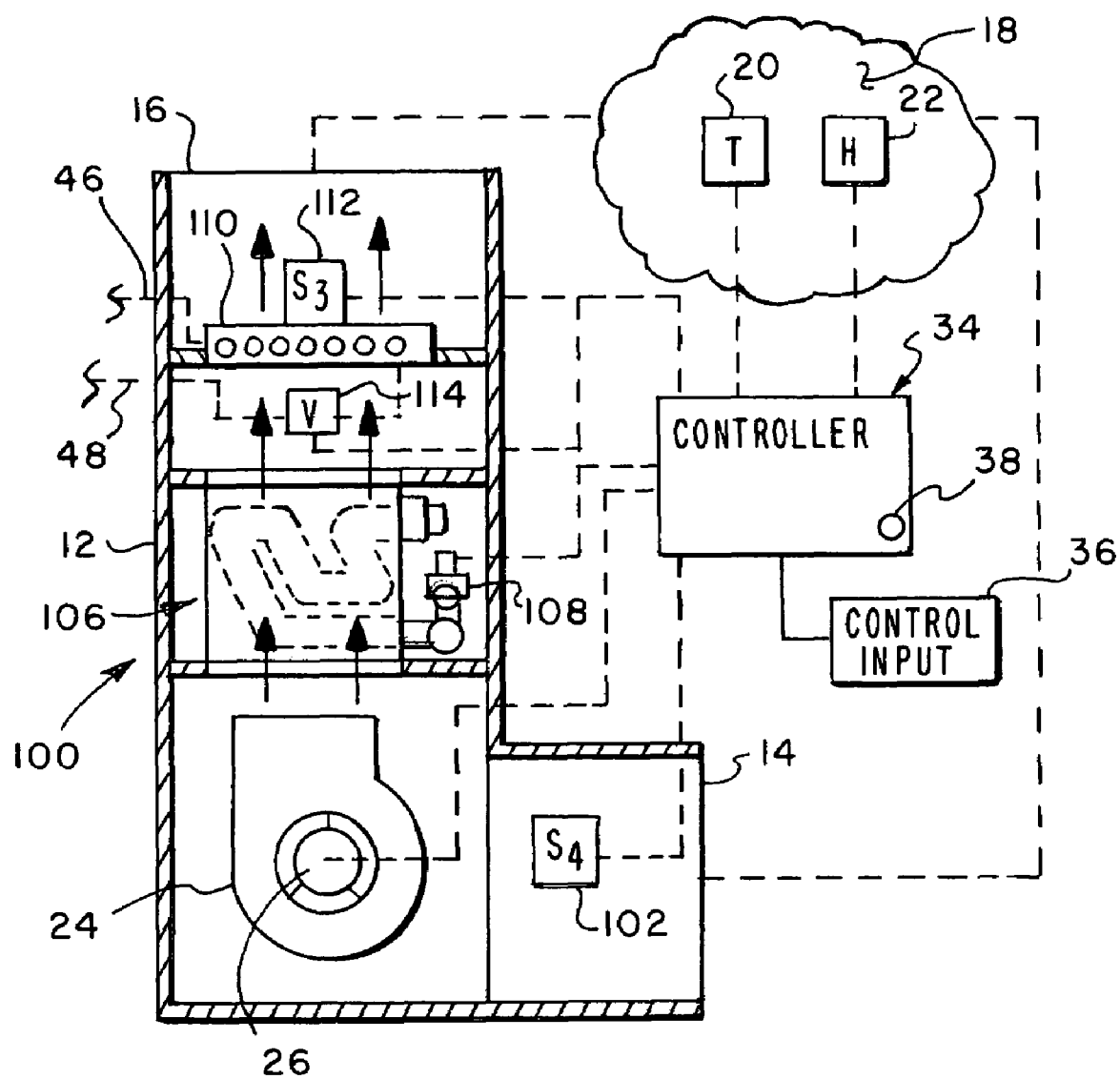
FIG. 2 is a schematic diagram of another version of an air conditioning system in accordance with the invention.

Referring now to FIG. 2, an alternate embodiment of a system in accordance with the invention is illustrated and generally designated by the numeral 100. The system 100 includes several components utilized in the system 10 including the variable speed motor driven blower 24 having a variable speed motor 26 and disposed within a cabinet 12 having an inlet opening 14 and a discharge opening 16. An inlet air temperature sensor 102 may be provided in the inlet duct portion of cabinet 12 which includes the opening 14. Suitable ducting, not shown, provides for discharging air through opening 16 to space 18 and returning air from space 18 to system inlet opening 14. A thermostat 20 and a humidity sensor 22 may be provided in space 18 communicating with a controller 34 having a visual indicator 38 and a control input device or unit 36 operably connected thereto.

The system 100 differs from the system 10 primarily in the provision of a source of heating comprising a furnace 106 disposed in cabinet 12 and of conventional design. Furnace 106 may be a combustion type and supplied with gaseous fuel via a controllable valve 108 for operation in a conventional manner. System 100 may also include a second source of heating or cooling comprising a heat exchanger 110 comprising part of and suitably connected to a vapor compression fluid circuit essentially the same as shown in FIG. 1 but operable primarily in the cooling mode only. A temperature sensor 112 is preferably mounted in very close proximity to the heat exchanger 110 or essentially contiguous with part of the heat exchanger structure to measure heat exchanger discharge temperature. Sensor 112 is operably connected to controller 34 and to a control device 114, such as a throttling valve, for controlling the flow of refrigerant fluid through the heat exchanger 110. The sensor 112 may operate in conjunction with the controller 34 and the control device 114 to maintain a predetermined constant temperature of the heat exchanger 110 and assist in maintaining a constant temperature of air being discharged through the opening 16 and returning to the space 18. Other techniques for controlling the temperature of heat exchanger 110 may be carried out.

The system 100 may be operated in accordance with the methods illustrated in FIGS. 3, 4 and 5 and described hereinabove. When operating in the heating mode, the heat exchanger 110 may be inactive and heat provided by forced airflow furnace 106 and controlled by controller 34. If the system 110 is to be operated in the cooling mode, as illustrated in the method of FIG. 5, furnace 106 would be deactivated and the vapor compression refrigerant fluid flow circuit shown in FIG. 1, but associated with heat exchanger 110 would be operable to provide the lower humidity required by sensor 22 and/or a lower discharge temperature from the heat exchanger 110.

Figure 6:
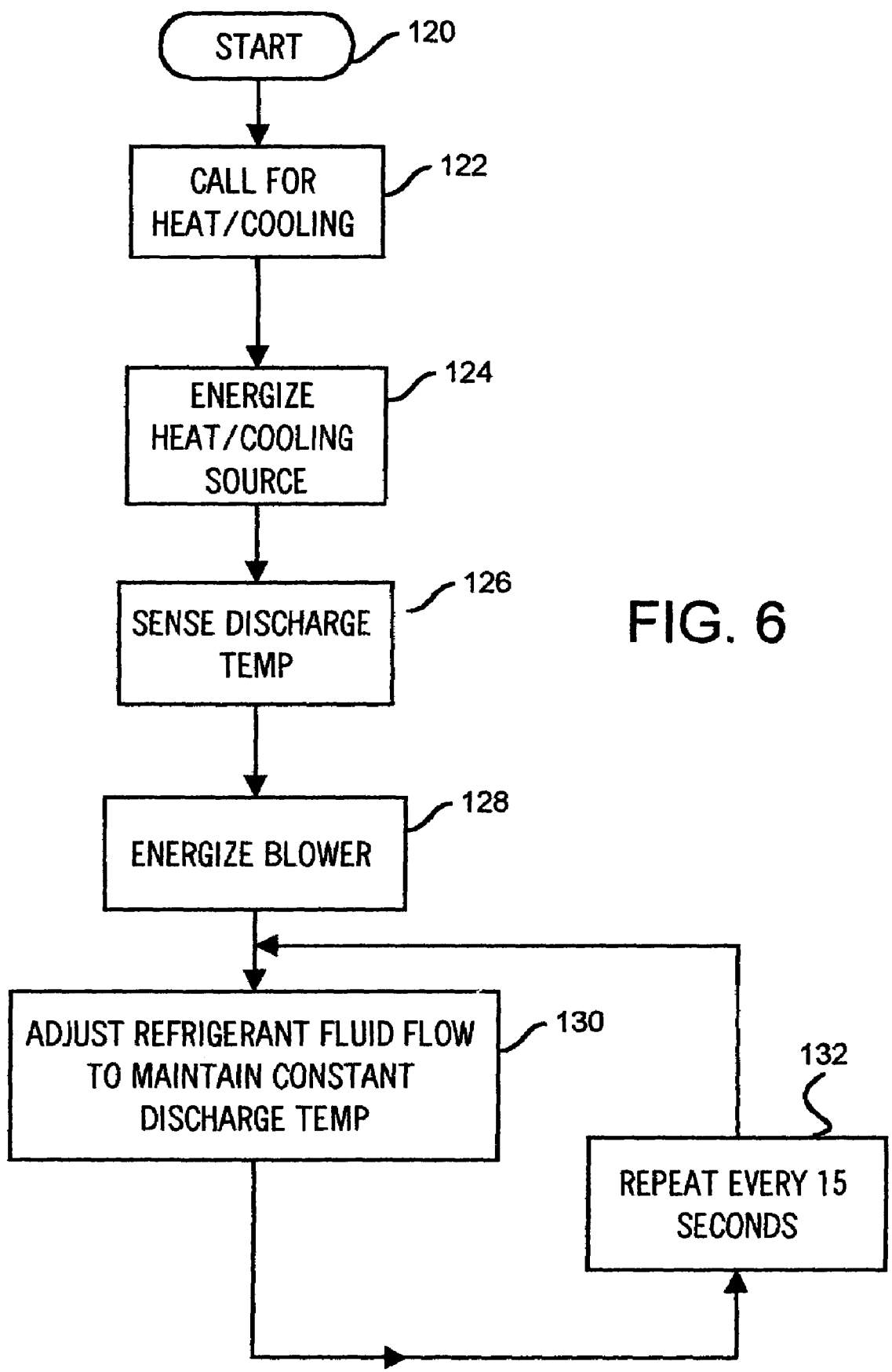
FIG. 6 is a flow diagram illustrating yet another method of operating an air conditioning system in accordance with the invention.

In the embodiment of FIG. 2, and operating according to the method of FIG. 6, if the heat exchanger 110 is operating to supply cooling or heating effect alone, the blower 24 may be operated at a constant or variable speed and the temperature sensor 112 may be operable through the controller 34 to control the flow of refrigerant fluid through the heat exchanger 110 to maintain a constant discharge temperature.

In this way the blower 24 in conjunction with the operation of the heat exchanger 110 and the associated refrigerant fluid flow system could eliminate the surge of cold or hot air that is often experienced when a heat pump type system initially starts up in the heating mode, as well as in the cooling mode.

Accordingly, referring to FIG. 6, when the system 100 is operating as described above and is enabled at step 120, upon receipt of a call for heat and/or cooling by thermostat 20 at step 122 the compressor 40 would be energized, as indicated at step 124, while the discharge temperature is sensed by sensor 112 and this information is furnished to controller 34 at step 126. Once the discharge temperature sensed by sensor 112 reaches a predetermined value, blower 24 may be energized at step 128 while discharge temperature is monitored by sensor 112 and refrigerant fluid flow is adjusted at the control device 114 to maintain a constant discharge temperature for heat exchanger 110 at step 130. This sensing and adjustment of step 130, repeated every fifteen seconds, as indicated at step 132. Thus, in the embodiment of FIG. 6, airflow rate may be substantially constant but discharge temperature is also held constant in that the blower 24 is not energized until the discharge temperature of heat exchanger 110 achieves the value preset by controller 34 and this value is held by, for example, adjusting refrigerant flow at device 114. Other methods of controlling the temperature of heat exchanger 110 may be provided.

Of course, if the system 100 is operating with the furnace 106 controlled by the gas flow control valve 108, system discharge temperature could also be held substantially constant by varying the firing rate of the furnace through suitable control of the valve 108 by the controller 34. Accordingly, the process illustrated in FIG. 6 can be carried out by operation of the system 100 using the furnace 106 alone or using the vapor compression fluid system including the heat exchanger 110 operating with or without operation of furnace 106.

Although several embodiments of an air conditioning system and method of operation of same have been described hereinabove in sufficient detail as to enable one skilled in the art to practice the invention, those skilled in the art will also recognize that various substitutions and modifications may be made without departing from the scope and spirit of the appended claims.

What is claimed is:

1. An air conditioning system including:
   a source of heating or cooling effect for transfer thereof to air to be conducted to an enclosed space;
   a motor driven air blower for conducting air through said source of heating or cooling effect to change the temperature of air being conducted to said space;
   at least one of a thermostat and humidity sensor disposed in said space for transmitting signals to a controller for said system, said controller being operably connected to a drive motor for said blower;
   a first temperature sensor disposed for sensing the temperature of air being discharged from said source of heating or cooling effect; and
   said controller being operable to energize said motor to conduct air from said space through said system and returned to said space at one of a constant temperature of air being discharged from said system to said space and reduced humidity sensed by said humidity sensor;
   wherein said source of heating comprises a furnace including a control device for controlling the heat output from said furnace, said control device being operably connected to said controller.

2. The system set forth in claim 1 wherein:

said motor is a variable speed motor and said controller is operable to vary the speed of said motor to vary the volume of airflow through said system to maintain said one of said constant discharge temperature and lower humidity, respectively.

3. The system set forth in claim 1 including:

a second temperature sensor for sensing the temperature of air returning to said system from said space and for providing a temperature signal to said controller.

4. The system set forth in claim 3 wherein:

said second temperature sensor comprises said thermostat.

5. The system set forth in claim 1 wherein:

said source of heating or cooling effect comprises a vapor compression refrigerant fluid flow circuit including a heat exchanger for receiving airflow from said blower and to be returned to said space and said first temperature sensor is disposed directly adjacent said heat exchanger for sensing the temperature of said heat exchanger exposed to air flowing therethrough; and a control device operably connected to said controller for maintaining a predetermined temperature sensed by said first temperature sensor.

6. The system set forth in claim 1 including:

a visual indicator associated with said controller for indicating the flow rate of air flowing through said system.

7. The system set forth in claim 1 wherein:

said controller is operably connected to a control input device for adjusting the discharge temperature set at said controller for controlling said one of said discharge temperature of air flowing to said space and said humidity in said space.

8. An air conditioning system including:

a source of cooling effect including a heat exchanger for cooling air to be conducted to an enclosed space;

a motor driven air blower for conducting air through said heat exchanger to reduce the temperature of air being conducted to said space;

a humidity sensor disposed in said space for transmitting signals to a controller for said system, said controller being operably connected to a drive motor for said blower;

a first temperature sensor disposed for sensing the temperature of air being discharged from said heat exchanger;

said controller being operable to energize said motor to conduct air from said space through said system and returned to said space at one of a constant temperature of air being discharged from said system to said space and reduced humidity sensed by said humidity sensor; and a visual indicator associated with said controller for indicating the flow rate of air flowing through said system.

9. The system set forth in claim 8 wherein:

said motor is a variable speed motor and said controller is operable to vary the speed of said motor to vary the volume of airflow through said system to maintain said one of said constant discharge temperature and lower humidity, respectively.

10. The system set forth in claim 8 wherein:

said source of cooling effect comprises a vapor compression refrigerant fluid flow circuit including said heat exchanger for receiving airflow from said blower and to be returned to said space and said first temperature sensor is disposed directly adjacent said heat exchanger for sensing the temperature of said heat exchanger exposed to air flowing therethrough; and a control device is operably connected to said controller for maintaining a predetermined temperature sensed by said first temperature sensor.

11. An air conditioning system including:

a source of heating effect for transfer thereof to air to be conducted to an enclosed space;

a motor driven air circulating blower for conducting air through said source of heating effect;

a thermostat disposed in said space for transmitting signals to a controller for said system, said controller being operably connected to a drive motor for said blower;

a first temperature sensor disposed for sensing the temperature of air being discharged from said source of heating effect;

a second temperature sensor for sensing the temperature of air returning to said system from said space and for providing a temperature signal to said controller;

comparing the temperatures sensed by the first and second temperature sensors; and said controller being operable to energize said motor to conduct air from said space through said system and returned to said space at a constant temperature of air being discharged from said system to said space.

12. The system set forth in claim 11 wherein:

said motor is a variable speed motor and said controller is operable to vary the speed of said motor to vary the volume of airflow through said system to maintain said constant discharge temperature.

13. The system set forth in claim 11 wherein:

said second temperature sensor comprises said thermostat.

14. The system set forth in claim 11 wherein:

said source of heating effect comprises a vapor compression refrigerant fluid flow circuit including a heat exchanger for receiving airflow from said blower and to be returned to said space.

15. The system set forth in claim 14 wherein:

said first temperature sensor is disposed directly adjacent said heat exchanger for sensing the temperature of said heat exchanger exposed to air flowing therethrough.

16. The system set forth in claim 15 including:

a control device operably connected to said controller for maintaining a predetermined temperature sensed by said first temperature sensor.

17. A method for operating an air conditioning system to supply conditioned air to a controlled space, said air conditioning system including a source of heating or cooling effect, a motor driven blower for conducting air through said system and in contact with said source of heating or cooling effect to condition air for return to said space, at least one of a thermostat and humidity sensor disposed for sensing air in said space and connected to a controller for controlling said blower, said method including the steps of:

responding to a signal from said thermostat calling for one of heating or cooling said space, energizing said system to provide one of heating or cooling effect by said source, energizing said blower to conduct air through said system from said space and returned to said space, sensing the discharge temperature of air flowing from said source;

adjusting one of the airflow through said system and the discharge temperature of air flowing from said source so as to provide one of maintaining a constant discharge temperature of air leaving said system and reducing the humidity in said space; and providing a first temperature sensor for sensing temperature of air returning to said system from said space and a second temperature sensor for sensing the temperature of air flowing from said source; and comparing the temperatures sensed by said sensors.

18. The method set forth in claim 17 wherein:

the step of adjusting airflow through said system is carried out by varying the speed of said blower.

19. The method set forth in claim 17 wherein:

said first temperature sensor is provided as said thermostat.

20. A method for operating an air conditioning system to supply conditioned air to a controlled space, said air conditioning system including a source of heating or cooling effect, a motor driven blower for conducting air through said system and in contact with said source of heating or cooling effect to condition air for return to said space, at least one of a thermostat and humidity sensor disposed for sensing air in said space and connected to a controller for controlling said blower, said method including the steps of:

responding to a signal from said thermostat calling for one of heating or cooling said space, energizing said system to provide one of heating or cooling effect by said source, energizing said blower to conduct air through said system from said space and returned to said space, sensing the discharge temperature of air flowing from said source;

adjusting one of the airflow through said system and the discharge temperature of air flowing from said source so as to provide one of maintaining a constant discharge temperature of air leaving said system and reducing the humidity in said space;

providing said source as a heat exchanger disposed in said system for flow of air thereover to be returned to said space and providing a temperature sensor at said heat exchanger for sensing the temperature of said heat exchanger exposed to said airflow thereover; and controlling the flow of a fluid through said heat exchanger to modify the temperature sensed by said temperature sensor.

21. A method for operating an air conditioning system to supply conditioned air to a controlled space, said air conditioning system including a source of heating or cooling effect, a motor driven blower for conducting air through said system and in contact with said source of heating or cooling effect to condition air fro return to said space, at least one of a thermostat and humidity sensor disposed for sensing air in said space and connected to a controller for controlling said blower, said method including the steps of:

responding to a signal from said thermostat calling for one of heating or cooling said space, energizing said system to provide one of heating or cooling effect by said source, energizing said blower to conduct air through said system from said space and returned to said space, sensing the discharge temperature of air flowing from said source;

adjusting one of the airflow through said system and the discharge temperature of air flowing from said source so as to provide one of maintaining a constant discharge temperature of air leaving said system and reducing the humidity in said space;

providing said source as a heat exchanger disposed in said system for flow of air thereover to be returned to said space and providing a temperature sensor at said heat exchanger for sensing the temperature of said heat exchanger exposed to said airflow thereover; and providing said heat exchanger as part of a refrigerant fluid flow circuit and adjusting the refrigerant fluid flow through said heat exchanger to provide one of control of humidity in said space and maintain a constant discharge temperature of air flowing from said system to said space.

* * * * *

UNITED STATES PATENT AND TRADEMARK OFFICE
CERTIFICATE OF CORRECTION

| | |
|---|---|
| PATENT NO. | : 7,228,693 B2 |
| APPLICATION NO. | : 10/755643 |
| DATED | : June 12, 2007 |
| INVENTOR(S) | : Robert W. Helt |

Page 1 of 1

It is certified that error appears in the above-identified patent and that said Letters Patent is hereby corrected as shown below:

Claim 21, line 6, "fro" should read --for--

Signed and Sealed this

Twenty-fourth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,228,693 B2  Page 1 of 1
APPLICATION NO. : 10/755643
DATED : June 12, 2007
INVENTOR(S) : Robert W. Helt It is certified that error appears in the above-identified patent and that said Letters Patent is hereby corrected as shown below:

Column 10, Claim 21, line 9, "fro" should read --for--

This certificate supersedes the Certificate of Correction issued June 24, 2008.

Signed and Sealed this

Twenty-second Day of July, 2008

JON W. DUDAS
*Director of the United States Patent and Trademark Office*